INVENTOR.
WILLIAM HORTON
BY
Weingarten, Orenbuch, & Pandiscio
ATTORNEYS

Aug. 18, 1964 W. P. HORTON 3,145,343

UNIVERSAL LOGICAL ELEMENT HAVING MEANS PREVENTING PULSE SPLITTING

Filed March 15, 1961 2 Sheets-Sheet 2

INVENTOR.
WILLIAM HORTON

BY
Weingarten, Orenbuch, & Pandiscio
ATTORNEYS

United States Patent Office 3,145,343
Patented Aug. 18, 1964

3,145,343
UNIVERSAL LOGICAL ELEMENT HAVING MEANS PREVENTING PULSE SPLITTING

William P. Horton, Natick, Mass., assignor to Computer Control Company, Inc., a corporation of Delaware Filed Mar. 15, 1961, Ser. No. 95,947
4 Claims. (Cl. 328—92)

This invention relates in general to high speed electronic computing apparatus and more particularly pertains to a logical element capable of serving as the fundamental building block from which can be constructed almost any type of high speed digital computing electronic system.

A universal logical element capable of operating at a rate of one megacycle per second is described in Patent No. 2,820,897. The present invention is an improved logical element for use in higher speed systems where the signals transmitted between logic elements may be D.C. levels rather than pulses.

The invention resides in an improved logical element employing non-return-to-zero information signals. The improved logical element is capable of performing logical operations at very high speeds and the signals transmitted between elements arranged to form a computer system are D.C. levels. Historically, dynamic systems have used return-to-zero signals. That is, dynamic systems have employed signals that represent binary "ones" or "zeros" by the presence or absence of pulses. In such systems, a pulse must rise before clock time and return to a reference level, usually the zero voltage level, before the next clock time. Return-to-zero i.e. dynamic systems, therefore, require their logical circuits to be capable of accommodating two transitions, one rise and one fall, for each bit of information. Non-return-to-zero signals, in contrast, represent information by two D.C. levels, binary "ones" being represented by one voltage level and binary "zeros" being represented by a different voltage level. In the non-return-to-zero system successive "ones" or successive "zeros" occur as continuous D.C. levels and do not require the signal to return to a different value between clock pulses. Therefore, non-return-to-zero signals require at most a single transition from one D.C. level to another for each information bit. Where a short time interval is available for signal transitions, as is the case in high speed computers, non-return-to-zero signal representation requires less stringent control of signal rise and fall time, and with active circuit components having a fixed gain-bandwidth product, non-return-to-zero operation can be carried on at higher rates (i.e. higher clock frequencies) than is possible with return-to-zero operation.

The invention utilizes non-return-to-zero signals in a static logical element to achieve high operating rates with maximum freedom from timing problems. The invention is embodied in a logical element having an input structure consisting of a number of AND gates. The input AND gates are arranged to provide one of two D.C. levels at their outputs, the D.C. level depending upon the manner in which the gate is conditioned by its inputs. In binary notation one D.C. level is represented by a ONE and the other D.C. level is represented by a ZERO. The input AND gates have their outputs connected through an OR gate to the input of an inverter. A pair of two-legged AND gates are arranged so that the output of one gate is coupled to the "set" input of a flip-flop and the output of the other gate is coupled to the flip-flop's "reset" input. Both of the two-legged AND gates have clock pulses applied to one of their inputs. The output of the OR gate is arranged to inhibit or to condition one of the two-legged AND gates to pass clock pulses and the output of the inverter is arranged to inhibit or to condition the other of those two gates to pass clock pulses. Where the output of the OR gate or the inverter is a ZERO, its associated two-legged AND gate is inhibited. Conversely, when the output of the OR gate or the inverter is a ONE, the associated AND gate is conditioned to pass clock pulses. This can be better understood by considering the outputs of the input AND gates to be signal sources. Since the input to the inverter is coupled through the OR gate to the signal sources, when any source signal is a ONE, the output of the OR gate is a ONE whereas the inverter's output is a ZERO. When all the source signals are ZERO, the inverter's output is a ONE. Therefore, where the output of the OR gate is a ZERO, one of the two-legged AND gates is inhibited and the other of those gates is at the same time conditioned to permit a clock pulse to "reset" the flip-flop. When the output of the OR gate is a ONE, the conditioning and inhibiting of the two-legged AND gates is reversed.

In order that the output of the logical element may be used as an input, fed back to itself, or as an input to other similar logical elements in a system, it is necessary to provide some delay in the output to prevent a high speed flip-flop from causing faulty operation by reconditioning the input of the logical element to which it is coupled during the existence of the same clock pulse which initiated the cycle of operation.

The organization of the invention and its mode of operation can be apprehended by a perusal of the following exposition when considered in conjunction with the accompanying drawings in which.

Figure 3:
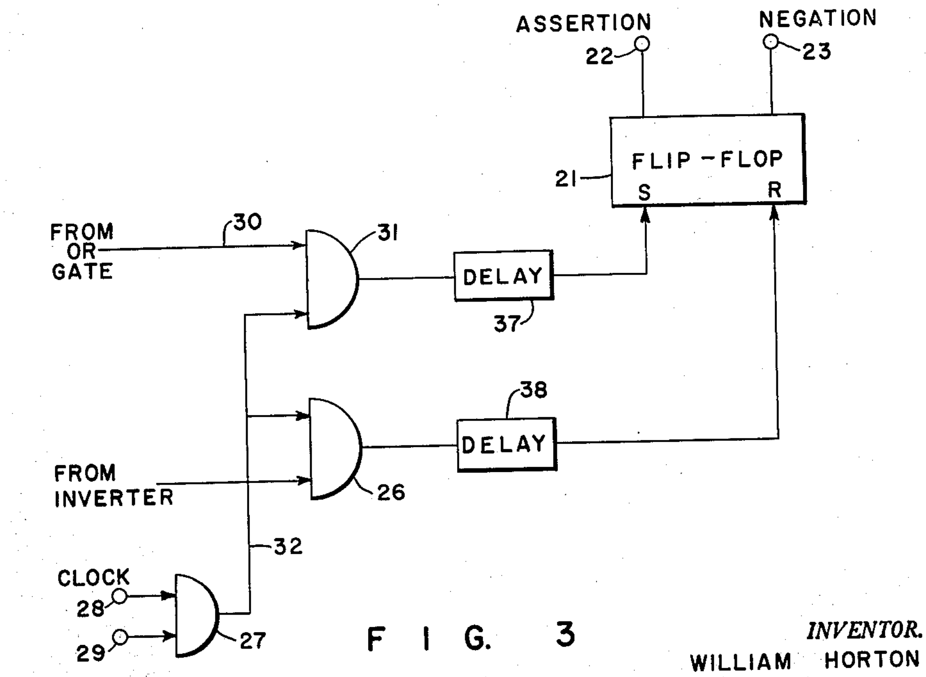

FIG. 3 schematically depicts a modification of the invention.

Figure 1:
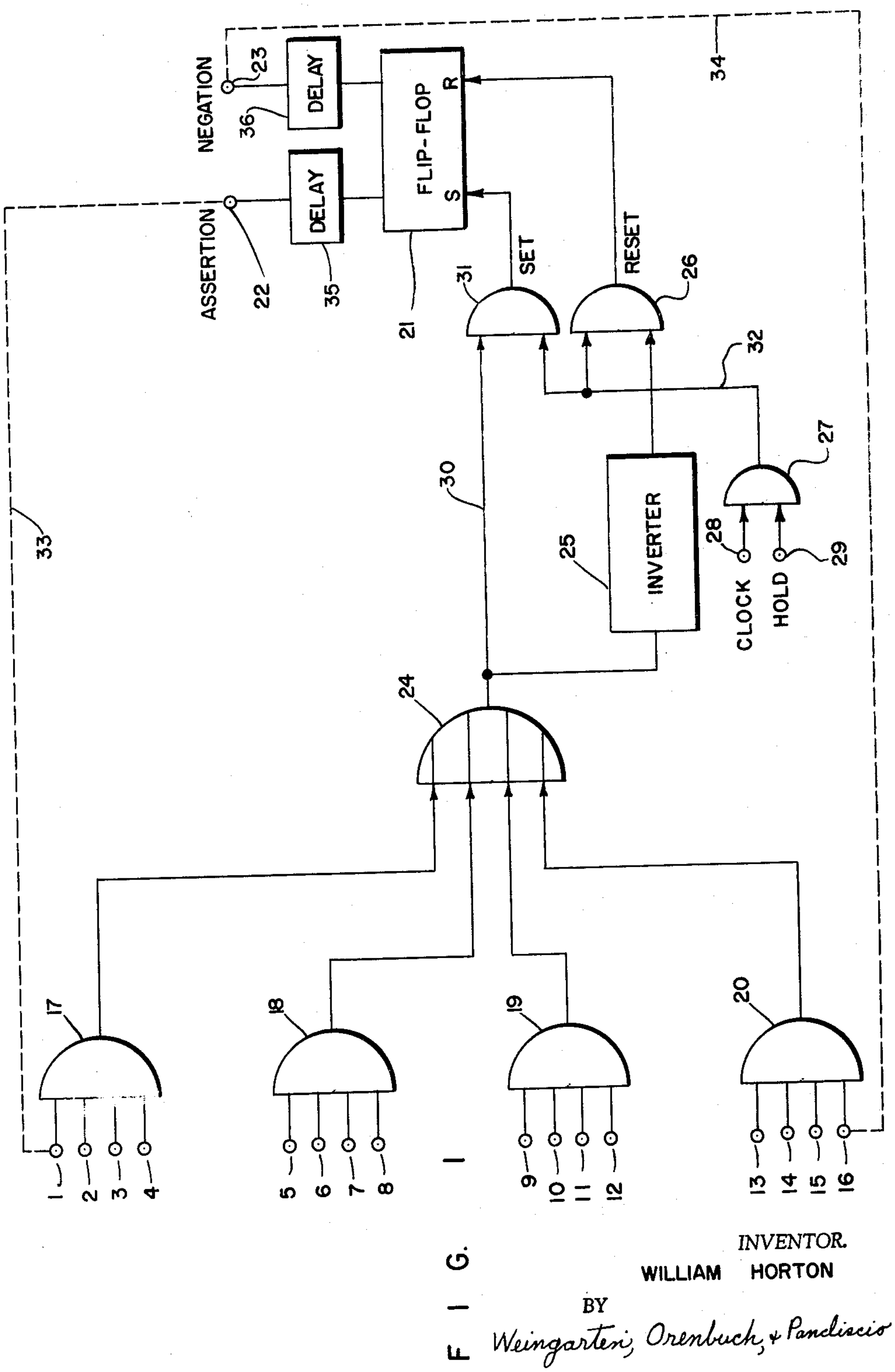
FIG. 1 illustrates the scheme of the invention.

Referring now to FIG. 1, there is shown the logical arrangement of a static digital circuit package capable of performing logical operations at high rates of speed. The outputs of the package are derived from a flip-flop 21 having output terminals 22 and 23, the signal obtained from terminal 22 being termed the assertion output and the signal obtained from terminal 23 being termed the negation output. The outputs of the package are of the non-return-to-zero type. That is, each output represents binary information by its D.C. level so that successive "ones" or successive "zeros" occur as continuous D.C. levels without the requirement that the signal return to a steady state between clock pulses. In a synchronous system, the clock pulse is the information sensing signal. The basic delay interval of such a system is the period between successive clock pulses. The width of the clock pulse establishes the time during which information is sensed. The clock pulse, of itself, carries no information from one circuit element to another. The flip-flop 21, in an ideal synchronous system, changes state only after a clock pulse and only the D.C. output levels of the flip-flop are transmitted between logic elements. It is well known that a flip-flop can be made to change states by applying a trigger pulse to the "off" side to cause that side to become conductive, or alternatively by applying a trigger pulse to the "on" side to cause that side to become cut off. In an ideal flip flop the outputs will when set or reset by a pulse change state simultaneous so that when the assertion output falls from a first D.C. level to a second D.C. level, the negation output concurrently rises from the second level to the first level. A practical flip-flop, however, does not function in the ideal manner. In a practical flip-flop, the "on" and "off" sides do not change their states simultaneously so that one of the flip-flop's outputs will fall before the other output starts to rise.

For the purposes of exposition, flip-flop 21 is assumed to operate in the ideal manner.

The input structure of the logical package depicted in FIG. 1 consists of a number of AND gates, four such "AND" gates 17, 18, 19, 20 being shown by way of example. Each AND gate has four inputs, although the number of inputs may be reduced or increased, as desired. The input terminals of the four AND gates are designated, in consecutive order, 1 through 16. Gates 17 to 20 are arranged so that each gate's output is either at one or the other of two D.C. levels, depending upon the conditioning of the gate. One of the two D.C. levels represents a binary ZERO and the other D.C. level represents a binary ONE. The outputs of the four-legged AND gates 17 to 20 are connected to a buffer 24, such buffers also being known as OR gates, the output of OR gate 24 being coupled to an inverter 25 whose output in turn, is connected to one input of AND gate 26. The other input to gate 26 is obtained from another AND gate 27 whose input 28 is energized to clock pulses and whose input 29 is adapted to receive gate inhibiting hold signals. The output of AND gate 26 is coupled to the reset (R) input of flip-flop 21. The output of buffer 24 is also coupled by line 30 to one input of AND gate 31. The other input to AND gate 31 is coupled by line 32 to the output of gate 27. Gate 31 is arranged so that a ZERO signal on line 30 inhibits the gate whereas a ONE signal conditions the gate to pass any coexistent clock pulse on line 32 to the set input of flip-flop 21. Gate 26 is arranged so that a ZERO signal from inverter 25 inhibits the gate whereas a ONE signal conditions the gate to pass clock pulses to the reset input of the flip-flop.

To illustrate the operation of the logical arrangement, assume a combination of inputs to gates 17, 18, 19, 20, conditioning any one of those gates so that its output is a ONE prior to or at the time a clock pulse is impressed at terminal 28 and assume that gate 27 is uninhibited so that the clock pulse is able to pass through it. The ONE signal is passed through buffer 24 to inverter 25 where the ONE signal is inverted and emerges as a ZERO. The emergent ZERO signal inhibits gate 26 and prevents the clock pulse on line 32 from passing through to the reset input of flip-flop 21. The ONE signal from gate 24 is also impressed upon line 30. The ONE signal, therefore, energizes one of the inputs of AND gate 31 so that the gate is conditioned to pass the clock pulse on line 32. The clock pulse passing through gate 31 "sets" the flip-flop 21 if it had been previously "reset," or leaves it "set" it had previously been "set." When the flip-flop is "set," the assertion output at terminal 22 is active, that is the assertion output is a ONE and the negation output is inactive, i.e., a ZERO. As long as the input signal to gate 31 is a ONE at clock time, the gate is conditioned to pass the clock pulse, the flip-flop remains "set," and the assertion output at terminal 22 remains a ONE while the negation output remains a ZERO.

Where the combination of inputs to gates 17 to 20 condition all those gates so that their outputs are ZEROS prior to or at clock time, the input to OR gate 24, is a ZERO and through the action of inverter 25, the ZERO emerges from the inverter as a ONE. The ZERO passing along line 30 inhibits gate 31 so that the clock pulse cannot pass through that gate. The ONE signal from the inverter conditions gate 26 so that it passes the clock pulse on line 32 to the reset input of flip-flop 21. If the flip-flop was previously reset it remains in that state. However, if the flip-flop was previously set, the actuation of the reset input causes the flip-flop to change states, whereupon the negation output becomes a ONE and the assertion output becomes a ZERO.

Where gates 17 to 20 are conditioned at clock time so that they each provide a ZERO output, for example, it is possible for one (or more) of those gates to be reconditioned during the existence of the clock pulse so that its output changes from ZERO to ONE. This condition is known as clock pulse splitting and can occur where the output of the logical package is used as an input feedback to itself, as indicated by the broken line 33 between the assertion output of flip-flop 21 and one of the inputs to gate 17, or as indicated by the broken line 34 between the negation output 23 and one of the inputs to gate 20. Clock pulse splitting can also occur where the output of one logical package is connected to an input of a similar logical package by a very short lead. Clock pulse splitting may result from a "late" clock pulse, from a "wide" clock pulse, or from an "early" input signal.

Figure 2:
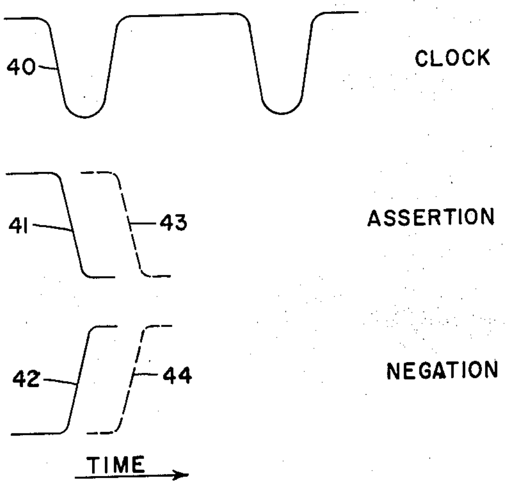
FIG. 2 depicts timing waveforms.

In a high-speed computer system the employment of a fast acting flip-flop becomes a requisite. In order to prevent the occurrence of clock pulse splitting, it is necessary to delay the output of the high-speed flip-flop. The delay may be provided as shown in FIG. 1 by inserting delay devices 35 and 36 between the assertion and negation terminals 22, 23 and the outputs of the flip-flop 21. The occurrence of clock pulse splitting can be more readily understood by considering that where the flip-flop 21 changes states, as shown in FIG. 2, in response to the leading edge of clock pulse 40, the assertion output falls (assuming the clock pulse 40 to be impressed on the S input terminal) as indicated by the wavefront 41 whereas the negation output rises as indicated by wavefront 42. The assertion and negation outputs, therefore, change D.C. levels during the existence of clock pulse 40 and since terminal 22 is connected to input terminal 1 and terminal 23 is connected to input terminal 16, either gate 17 or gate 20 may be reconditioned and set into effect a train of events causing the flip-flop 21 to be reset during the existence of clock pulse 40. To prevent that faulty operation from occurring, delay devices 35 and 36 cause the wavefronts 41 and 42 to be delayed by an interval sufficient to insure the decay of clock pulse 40. The wavefronts appearing at the assertion and negation terminals 22, 23 are therefore retarded in time as indicated by the wavefronts 43 and 44 in FIG. 2.

An alternative placement for the delay devices is illustrated in FIG. 3 where delay lines 37, 38 are interposed between the outputs of gates 31, 26 and the set and reset inputs of flip-flop 21. The delay lines 37, 38 causes the transmission of the clock pulse to be delayed so that by the time the transmitted pulse reaches the set or reset terminal, the pulse impressed at terminal 28 has decayed. That is, delay lines 37, 38 effect a delay in signal transmission equal to the width of the clock pulse.

In an ideal system, the flip-flop 21 would not change states until after the termination of the clock pulse. It is, therefore, feasible to employ a flip-flop which reacts only to the rear edge of the clock pulse. This is, colloquially, known as using "trailing edge" action into the flip-flop.

The logical package can, of course, be constructed without any means for delaying the output signals and the necessary delay can, then, be provided by external elements.

While several embodiments are disclosed and illustrated herein, various alterations and substitutions are obvious and may be made without departing from the essence of the invention. It is intended, therefore, that the invention's scope not be limited to the precise arrangement depicted in the drawings, but rather that the invention be construed in accordance with the appended claims.

What is claimed is:

1. A universal logical package comprising a plurality of input gates, each input gate having a plurality of input terminals, a bi-stable element having a negation and assertion output terminal for providing the output signals of the logical package, means buffering the outputs of the input gates, the buffering means providing either one of two D.C. levels at its output, an inverter connected to the buffering means for providing the other of the two D.C. levels at its output, first and second gates controlled respectively by the output of the buffering means and the output of the inverter, each controlled gate being connected to a different input of the bi-stable element, means for simultaneously impressing a clock pulse on the first and second gates, and means connecting the assertion and negation terminals of the bi-stable element respectively to an input terminal of a corresponding input gate for delaying the application of the output signals of the logical package to said corresponding input gates.

2. A universal logical package comprising a plurality of input gates, each input gate having a plurality of input terminals and providing one or the other of two D.C. levels at its output, a flip-flop providing the output signals of the logical package, an OR gate buffering the outputs of the input gate, an inverter having its input coupled to the OR gate's output, a first AND gate having one input coupled to the OR gate's output, a second AND gate having one input coupled to the inverter's output, means coupling other inputs of the first and second AND gates to a clock pulse input terminal, means coupling the outputs of the first and second AND gates to different inputs of the flip-flop, means connected to the flip-flop for delaying the output signals of the logical package and means for connecting the output signals of said logical package to input terminals of said input gates so as to prevent the arrival of said signals to said respective input terminals for an interval sufficient to ensure the decay of a clock pulse.

3. A universal logic package comprising a plurality of input gates, each input gate having a plurality of input terminals, a flip-flop having a first and second output, an OR gate buffering the outputs of the input gates, an inverter having its input coupled to the OR gate's output, a first AND gate having one input connected to the OR gate's output, a second AND gate having one input connected to the inverter's output, means coupling other inputs of the first and second AND gates to a clock pulse input terminal, means coupling the outputs of the first and second AND gates to different inputs of the flip-flop, first delay means coupled between one output of the flip-flop and an input terminal of one of said input gates, and a second delay means coupled between the other output of the flip-flop and an input terminal of another of said input gates.

4. A universal logic package comprising a plurality of input gates, each input gate having a plurality of input terminals, a flip-flop having a pair of input terminals and a pair of output terminals, an OR gate buffering the outputs of the input gates, an inverter having its input coupled to the OR gate's output, a first AND gate having one input connected to the OR gate's output, a second AND gate having one input connected to the inverter's output, means coupling other inputs of the first and second AND gates to a clock pulse input terminal, first signal delay means connected between the output of said first AND gate and one input terminal of the flip-flop, second signal delay means connected between the output of said second AND gate and the other input terminal of the flip-flop, and means respectively connecting the output terminals of said flip-flop with corresponding ones of input terminals of respective ones of said input gates.

References Cited in the file of this patent

UNITED STATES PATENTS

| | | |
|---|---|---|
| 2,918,587 | Rector et al. | Dec. 22, 1959 |
| 2,950,461 | Tryon | Aug. 23, 1960 |
| 2,967,276 | Colten | Jan. 3, 1961 |

FOREIGN PATENTS

| | | |
|---|---|---|
| 209,009 | Australia | July 26, 1956 |

OTHER REFERENCES

Arithmetic Operations in Digital Computers by Richards, published by D. Van Nostrand Co., New York, 1955, page 145.